(No Model.)
C. A. DAMMANN.
HOLDBACK.
No. 440,347. Patented Nov. 11, 1890.
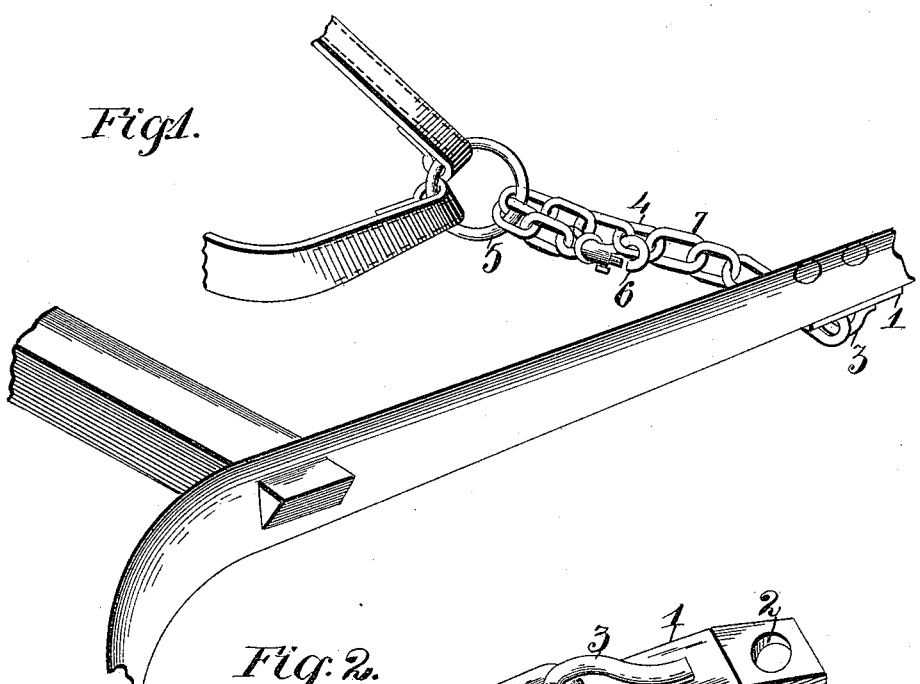
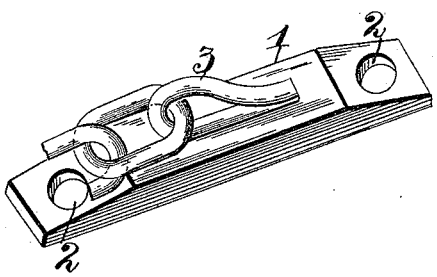
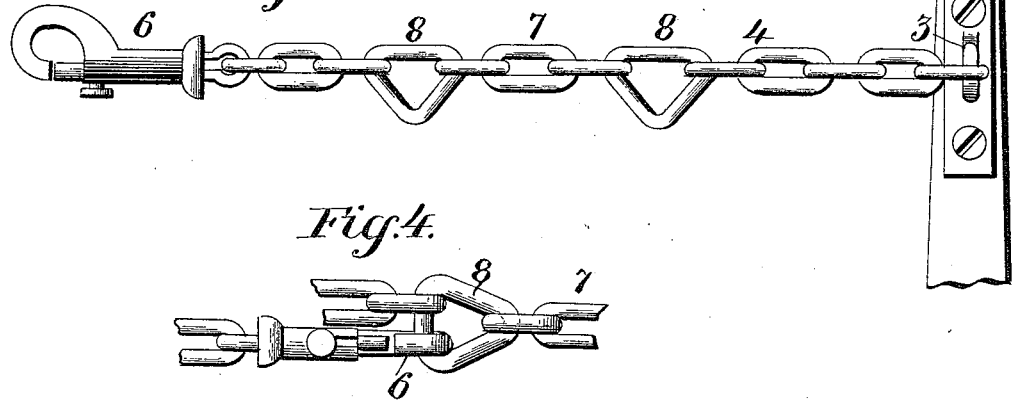
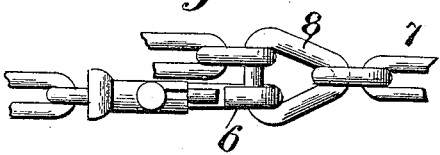
WITNESSES:
INVENTOR
Conrad A. Dammann.
BY Higdon & Higdon
ATTORNEYS.

UNITED STATES PATENT OFFICE.

CONRAD A. DAMMANN, OF ST. LOUIS, MISSOURI.

HOLDBACK.

SPECIFICATION forming part of Letters Patent No. 440,347, dated November 11, 1890.

Application filed August 4, 1890. Serial No. 360,941. (No model.)

*To all whom it may concern:*

Be it known that I, CONRAD A. DAMMANN, of St. Louis, in the State of Missouri, have invented certain new and useful Improvements in Holdback Devices, of which the following is a full, clear, and exact description, reference being had to the accompanying drawings, forming a part hereof.

My invention has for its object to provide a novel and simplified holdback device; and it consists in the novel combination and arrangement of parts, as will be hereinafter fully described, and designated in the claims.

In the drawings, Figure 1 is a perspective view of my invention as applied to the shaft and harness. Fig. 2 is a perspective view of the metallic plate made use of for attaching the device to the shaft of a vehicle. Fig. 3 is a plan view of a modification of my invention; and Fig. 4 is a top plan view of the same, showing the manner of fastening when in use.

The object of my invention is to provide a simple and durable device which is adapted to be attached to the under surface of the shafts of a vehicle; and it consists of a chain having a snap-hook attached to one of its ends, said chain and snap-hook adapted to be passed through the breeching-ring of the harness and fastened to the same, as fully shown in Fig. 1, and which will be hereinafter fully described.

In the drawings, 1 represents a metallic plate of suitable length and width to present a neat appearance on the shafts, and 2 2 are two circular openings formed in the said plate for attaching the same to the shafts of the vehicle by means of bolts.

3 represents an eye welded or otherwise secured to the plate 1 in an inclined position, and which is formed by doubling a single piece of metal to form a loop, the ends of which are brought together and project toward the ends of the shafts, the loop portion thereof forming an attachment for the chain 4. The chain 4, as shown in Fig. 1, is of the usual construction, having metallic links, and of sufficient length to allow itself to be passed through the breeching-ring 5 of the harness and drawn toward the shafts. To the free end of the chain 4 is attached a snap-hook 6, which is adapted to engage any one of the links 7 of the said chain, by which means the device can be lengthened or shortened, as required, to suit the different sizes of horses.

In the modification shown in Fig. 3 the chain is constructed of ordinary links 7 and triangular-shaped links 8, by which construction the snap-hook and chain after being passed through the breeching-ring the former can be easily inserted in any one of the said triangular links 8, as shown in Fig. 4, the said links affording sufficient space for attaching and detaching the device.

This device is permanently attached to the shafts of the vehicle, and when in use presents a neat appearance, it also being simple and durable in its parts, and further, being adjustable, can be quickly adjusted, fastened, and released.

Having fully described my invention, what I claim is—

1. A holdback device consisting of a metal chain fastened to the shaft of a vehicle and a snap-hook attached to the free end of the said chain and adapted to be passed through the breeching-ring of the harness and engage the links of the chain, substantially as described.

2. A hold back device consisting of a chain fastened to the shaft of the vehicle and provided with a suitable number of triangular-shaped links and a snap-hook attached to the free end of the said chain and adapted to be passed through the breeching-ring of the harness and engage the said triangular-shaped links, substantially as described.

In testimony whereof I affix my signature in presence of two witnesses.

CONRAD A. DAMMANN.

Witnesses:
 JNO. C. HIGDON,
 C. F. KEELER.